(12) United States Patent
Lin et al.

(10) Patent No.: US 10,040,514 B1
(45) Date of Patent: Aug. 7, 2018

(54) TESTING DEVICE FOR MODEL OF FLOATING GATE AND METHOD OF USING THE SAME

(71) Applicant: Dalian University of Technology, Dalian (CN)

(72) Inventors: Yan Lin, Dalian (CN); Xiaoning Jiang, Dalian (CN); Yanyun Yu, Dalian (CN); Fei Pei, Dalian (CN); Guan Guan, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 15/870,960

(22) Filed: Jan. 14, 2018

(30) Foreign Application Priority Data

Jul. 5, 2017 (CN) .......................... 2017 1 0541407
Jul. 5, 2017 (CN) ..................... 2017 2 0804595 U

(51) Int. Cl.
*F03B 13/18* (2006.01)
*B63B 9/02* (2006.01)
*G01M 10/00* (2006.01)

(52) U.S. Cl.
CPC .............. *B63B 9/02* (2013.01); *F03B 13/184* (2013.01); *G01M 10/00* (2013.01)

(58) Field of Classification Search
CPC ......... B63B 9/02; F03B 13/184; G01M 10/00
See application file for complete search history.

(56) References Cited

U.S. PATENT DOCUMENTS

| | | | | |
|---|---|---|---|---|
| 4,843,249 A | * | 6/1989 | Bussiere | F03B 13/183 |
| | | | | 290/42 |
| 4,993,348 A | * | 2/1991 | Wald | B63B 1/107 |
| | | | | 114/265 |
| 5,369,992 A | * | 12/1994 | Meng | G01M 10/00 |
| | | | | 73/148 |
| 5,898,109 A | * | 4/1999 | Nedderman, Jr. | B63B 9/02 |
| | | | | 73/147 |
| 2002/0195823 A1 | * | 12/2002 | Aguirre | F03B 13/184 |
| | | | | 290/53 |

FOREIGN PATENT DOCUMENTS

| | | | | |
|---|---|---|---|---|
| EP | 2469257 A1 | * | 6/2012 | E02D 15/08 |
| WO | WO-2004111605 A2 | * | 12/2004 | G01M 10/00 |

* cited by examiner

*Primary Examiner* — Benjamin F Fiorello
(74) *Attorney, Agent, or Firm* — Matthias Scholl, PC; Matthias Scholl

(57) ABSTRACT

A testing device for a model of a floating gate, the device including: a towing carriage including a platform and a moon pool; a square support mechanism including two upper transversal beams, two upper longitudinal beams, two I-shaped longitudinal beams, four lower beams, and straight plates disposed on two of the four lower beams; a dynamometric mechanism including a longitudinal tensiometer, a transversal tensiometer, and a signal transmitting terminal; a data acquisition mechanism including a computer and a signal receiving terminal; a casing mechanism including two stepped shafts and two rolling wheels; and a guide rod mechanism including an inner sleeve, an outer sleeve, and a connecting plate. One end of the connecting plate is connected to the lower end of the inner sleeve, and the other end thereof is connected to a deck of the floating gate.

4 Claims, 17 Drawing Sheets

TESTING DEVICE FOR MODEL OF FLOATING GATE AND METHOD OF USING THE SAME

CROSS-REFERENCE TO RELATED APPLICATIONS

Pursuant to 35 U.S.C. § 119 and the Paris Convention Treaty, this application claims foreign priority benefits to Chinese Patent Application No. 201710541407.9 filed Jul. 5, 2017, and to Chinese Patent Application No. 201720804595.5 filed Jul. 5, 2017. The contents of all of the aforementioned applications, including any intervening amendments thereto, are incorporated herein by reference.

BACKGROUND OF THE INVENTION

Field of the Invention

The disclosure relates to a testing device for a model of a floating gate and a method of using the same.

Description of the Related Art

Typically, the speed test of ship models is performed in a towing tank. The water in the towing tank is stationary or in a wave-generating state. Conventionally, a towing carriage of a towing tank fails to produce flowing water with current of various angles, which means the hydrodynamic parameters of a model of a floating gate cannot be measured in a towing tank.

SUMMARY OF THE INVENTION

In view of the technical problems mentioned above, one objective of the disclosure is to provide a testing device for a model of a floating gate and a method of using the same. The testing device can guide a model of a floating gate to move in multiple degrees of freedom. Therefore, it can measure hydrodynamic parameters of a model of a floating gate under currents of various angles.

To achieve the above objectives, in accordance with one embodiment of the invention, there is provided a testing device for a model of a floating gate, the device comprising:
- a towing carriage comprising a platform and a moon pool;
- a square support mechanism comprising two upper transversal beams, two upper longitudinal beams, two I-shaped longitudinal beams, four lower beams, and straight plates disposed on two of the four lower beams; the two I-shaped longitudinal beams comprising guide slots and four retaining clips disposed at two sides of the guide slots;
- a dynamometric mechanism comprising a longitudinal tensiometer, a transversal tensiometer, and a signal transmitting terminal; two ends of the longitudinal tensiometer and the transversal tensiometer being connected to first steel ropes and second steel ropes, respectively;
- a data acquisition mechanism comprising a computer and a signal receiving terminal;
- a casing mechanism comprising two stepped shafts and two rolling wheels, the two rolling wheels being connected to the two stepped shafts, respectively; and
- a guide rod mechanism comprising an inner sleeve, an outer sleeve, and a connecting plate; one end of the connecting plate being connected to a lower end of the inner sleeve, and the other end being connected to a deck of the floating gate.

The platform of the towing carriage is supported by the rail on the upper surface of the longitudinal wall of the towing tank. The computer of the data acquisition mechanism is adapted to control the towing carriage to reciprocate. The square support mechanism is disposed in the moon pool of the towing carriage. The two upper transversal beams are disposed on the two I-shaped longitudinal beams. The two upper transversal beams and the two I-shaped longitudinal beams form a rectangular structure, and the two upper transversal beams are fastened to the two I-shaped longitudinal beams via four fastening clips; each of the four fastening clips comprises a boss, and both ends of the two upper transversal beams are provided with a slot corresponding to the boss. The boss is fixed in the slot using a fastening bolt, so that the square support mechanism is connected to the towing carriage. The casing mechanism is disposed between the two upper longitudinal beams of the square support mechanism, the two rolling wheels slide in the guide slots of the two upper longitudinal beams, and the four retaining clips disposed at two sides of the guide slots limit a moving range of the two rolling wheels. The guide rod mechanism is disposed in the casing mechanism. The inner sleeve of the guide rod mechanism is inserted in and concentric with the outer sleeve. The inner sleeve is fastened to the outer sleeve via four fastening bolts; and the connecting plate connected to the lower end of the inner sleeve is connected to a deck of a floating gate via connecting bolts and connecting nuts. The dynamometric mechanism is disposed in a plane defined by the four lower beams of the square support mechanism, and is connected to the outer sleeve of the guide rod mechanism and the straight plates on the lower beams of the square support mechanism via the first steel ropes and the second steel ropes connected to the longitudinal tensiometer and the transversal tensiometer. The data acquisition mechanism is disposed on the platform of the towing carriage, and the signal receiving terminal of the data acquisition mechanism is in data communication with the signal transmitting terminal of the dynamometric mechanism.

In a class of this embodiment, the guide rod mechanism further comprises a dial scale. The outer sleeve and the dial scale sleeve the inner sleeve. The inner sleeve and the outer sleeve are arranged in the same radial direction and are axially movable and rotatable about an axis. The inner sleeve comprises an outer wall, a baseline disposed on the outer wall, a top end, a hoist ring disposed on the top end, and a wrench hole radially formed on an upper part of the inner sleeve; an angle wrench is disposed in the wrench hole and adapted to drive the inner sleeve such that the baseline on the inner sleeve corresponds to a scale line on the dial scale to adjust a relative rotation angle between the inner sleeve and the outer sleeve. The hoist ring is connected to a hoist. The lower end of the inner sleeve is connected to the connecting plate.

In a class of this embodiment, the casing mechanism further comprises a universal joint sleeve sleeving the outer sleeve of the guide rod mechanism; the two stepped shafts comprise first ends and second ends, and a diameter of the first ends is larger than that of the second ends; the two stepped shafts are radially symmetrically connected to the universal-joint sleeve via the first ends; the two rolling wheels comprise axle holes, and the second ends of the two stepped shafts pass through the axle holes, respectively; the rolling wheels are capable of rotating freely about the two stepped shafts; the second ends of the two stepped shafts comprise shaft-end bolt holes, and shaft-end bolts are disposed in the shaft-end bolt holes; a diameter of the first ends of the two stepped shafts and a diameter of nuts of the shaft-end bolts are larger than a diameter of the axle hole of the two rolling wheels; the two rolling wheels roll in the guide slots of the two upper longitudinal beams, respectively; the two stepped shafts are parallel to the two upper transversal beams and perpendicular to the two upper longitudinal beams; the universal-joint sleeve swings about the axis of the two stepped shafts; the universal-joint sleeve further comprises two longitudinal shaft holes which are radially formed in the universal-joint sleeve and perpendicular to the two stepped shafts; the outer sleeve comprises two radially symmetrically bolt holes; two longitudinal shaft bolts pass through the two longitudinal shaft holes of the universal-joint sleeve, and are fixed on the two radially symmetrically bolt holes of the outer sleeve.

A method with multiple degrees of freedom for operating the testing device for a model of a floating gate described above comprises the steps of:

1) determining a speed for towing the towing carriage based on a water flow rate and a scale ratio of the model of a floating gate;
2) determining an angle of current between the model of a floating gate and a moving direction of the towing carriage based on a water flow direction;
3) marking waterlines at both ends of the model of a floating gate based on a designed draft of the floating gate and a scale ratio of the model, and adjusting a height difference between the waterlines and a water surface of a towing tank by changing the weight and distribution of counter weights in watertight compartments of the model;
4) mounting and fastening the square support mechanism on the moon pool of the towing carriage via fastening clips; placing and fastening the guide mechanism in the casing mechanism via fastening bolts; hoisting and mounting the guide mechanism and the casing mechanism in the square support mechanism, and allowing the two rolling wheels of the casing mechanism to be in the guide slots;
5) allowing the model of a floating gate to float below the moon pool of the towing carriage, and connecting the model of a floating gate to the inner sleeve of the guide rod mechanism;
6) turning the inner sleeve using an angle wrench to align a scale line on a dial scale of the guide rod mechanism with a baseline of the inner sleeve based on the angle of current, and then tightening the inner sleeve and the model of a floating gate;
7) adjusting a position of the two rolling wheels in the guide slots of the two upper longitudinal beams, determining a longitudinal position of the model of a floating gate in the moon pool, and then fixing the two rolling wheels in the guide slots via the four retaining clips;
8) installing the longitudinal tensiometer and the transversal tensiometer, connecting the first steel ropes and the second steel ropes, and allowing the inner sleeve to swing freely in the casing mechanism; and
9) initializing and calibrating the longitudinal tensiometer and the transversal tensiometer; confirming communication connection between the signal transmitting terminal and the signal receiving terminal; controlling, by the computer, a towing speed, an acceleration, and a travel distance of the towing carriage; on-line recording and analyzing date through measurement and analysis software installed in the computer, and storing a backup file in a database.

The testing device for a model of a floating gate of the disclosure has the following advantages. In this testing device for a model of a floating gate, the towing carriage is disposed on the rail. Under control of the computer of the data acquisition mechanism, the towing carriage reciprocates at various speeds in the moving direction. The square support mechanism is disposed in the moon pool of the towing carriage. The rolling wheels of the casing mechanism are disposed in the guide slots of the upper longitudinal beams of the square support mechanism. The dynamometric mechanism is connected to the outer sleeve of the casing mechanism and the straight plate disposed at the lower beams of the square support mechanism via first steel ropes and second steel ropes connected to both ends of the longitudinal tensiometer and the transversal tensiometer. In this way, the upper parts of the square support mechanism and the guide rod mechanism are connected via the casing mechanism, and the lower parts of the square support mechanism and the guide rod mechanism are connected via the dynamometric mechanism. The deck of the floating gate is overlapped with the connecting plate of the guide rod mechanism. The data acquisition mechanism is disposed on the platform of the towing carriage, and comprises a signal receiving terminal in data communication with a signal transmitting terminals of the dynamometric mechanism. The testing device can guide the model with multiple degrees of freedom, meeting the requirement for hydrodynamic measurement of a model of a floating gate under current of various angles, and is also applicable to hydrodynamic tests for other floating structures.

Figure 1:
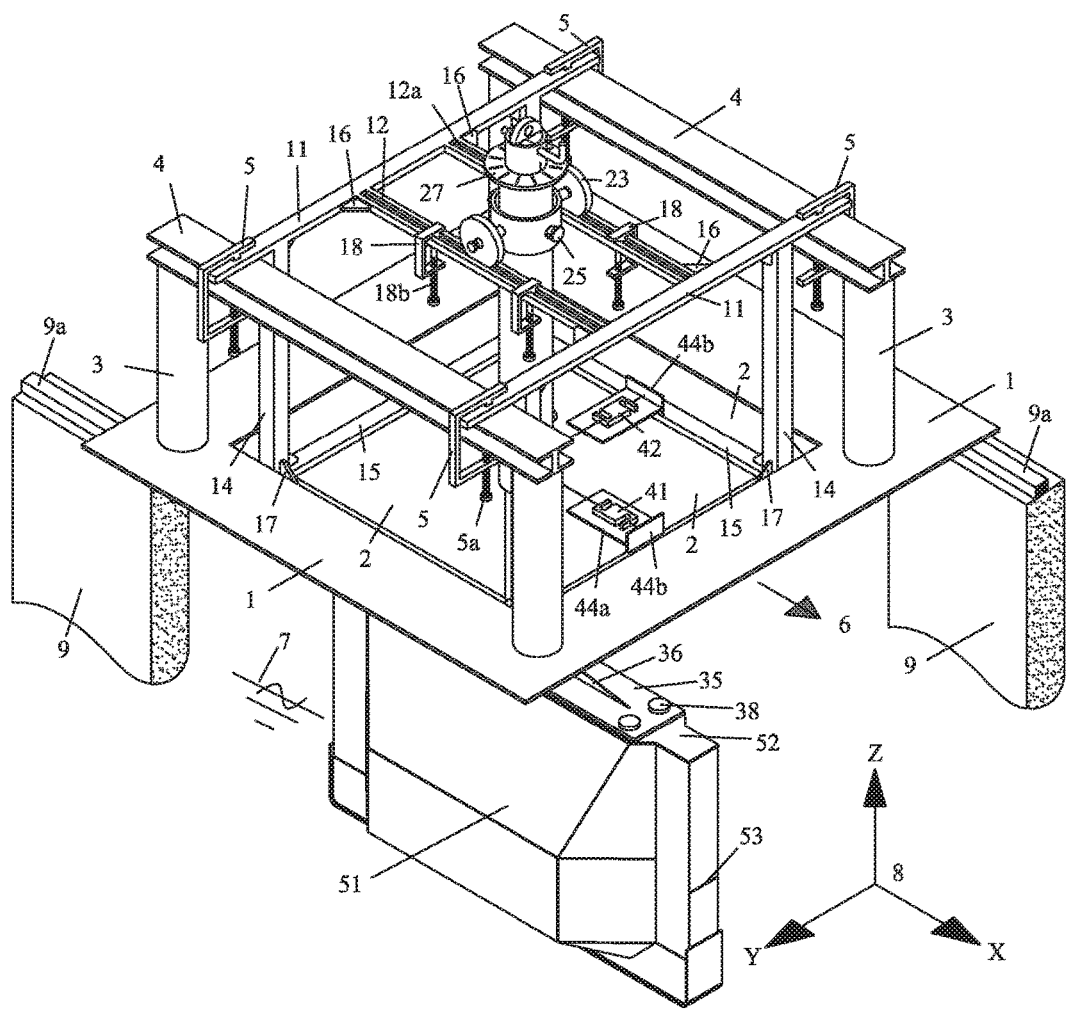
FIG. 1 is a perspective view of a testing device for a model of a floating gate in accordance with one embodiment of the disclosure.

In the drawings, the following reference numbers are used: 1. platform, 2. moon pool, 3. ciruclar column, 4. I-shaped longitudinal beam, 5. fastening clip, 5a. fixing bolt, 6. moving direction of a towing carriage, 7. water surface, 8. coordinate system, 9. longitudinal wall, 9a. rail, 11. upper transversal beam, 11a. slot, 12. upper longitudinal beam, 12a. guide slot, 14. square column, 15. lower beam, 16. horizontal bracket, 17. vertical bracket, 18. retaining clip, 18a. retaining boss, 18b. retaining bolt, 21. universal joint sleeve, 21a. longitudinal shaft hole, 22. stepped shaft, 22a. shaft-end bolt hole, 23. rolling wheel, 23a. axle hole, 24. shaft-end bolt, 25. longitudinal shaft bolt, 26. outer sleeve, 26a. shaft bolt hole, 26b. fastening bolt, 26c. fastening bolt hole, 27. dial scale, 27a. scale line, 31. inner sleeve, 31a. wrench hole, 32. angle wrench, 33. hoist ring, 35. connecting plate, 36. long bracket, 37. short bracket, 38. connecting bolt, 39. nut, 41. longitudinal tensiometer, 42. transversal tensiometer, 43. signal transmitting terminal, 44a. support plate, 44b. straight plate, 45a. first steel rope, 45b. second steel rope, 51. model of a floating gate, 52. deck, 53. waterline, 54. horizontal watertight separator, 55. vertical watertight separator, 56. counter weight, 57. watertight compartment, 61. computer, 62. database, 63. signal receiving terminal.

DETAILED DESCRIPTION OF THE EMBODIMENTS

For further illustrating the invention, experiments detailing a testing device for a model of a floating gate are described below. It should be noted that the following examples are intended to describe and not to limit the invention.

Figure 2:
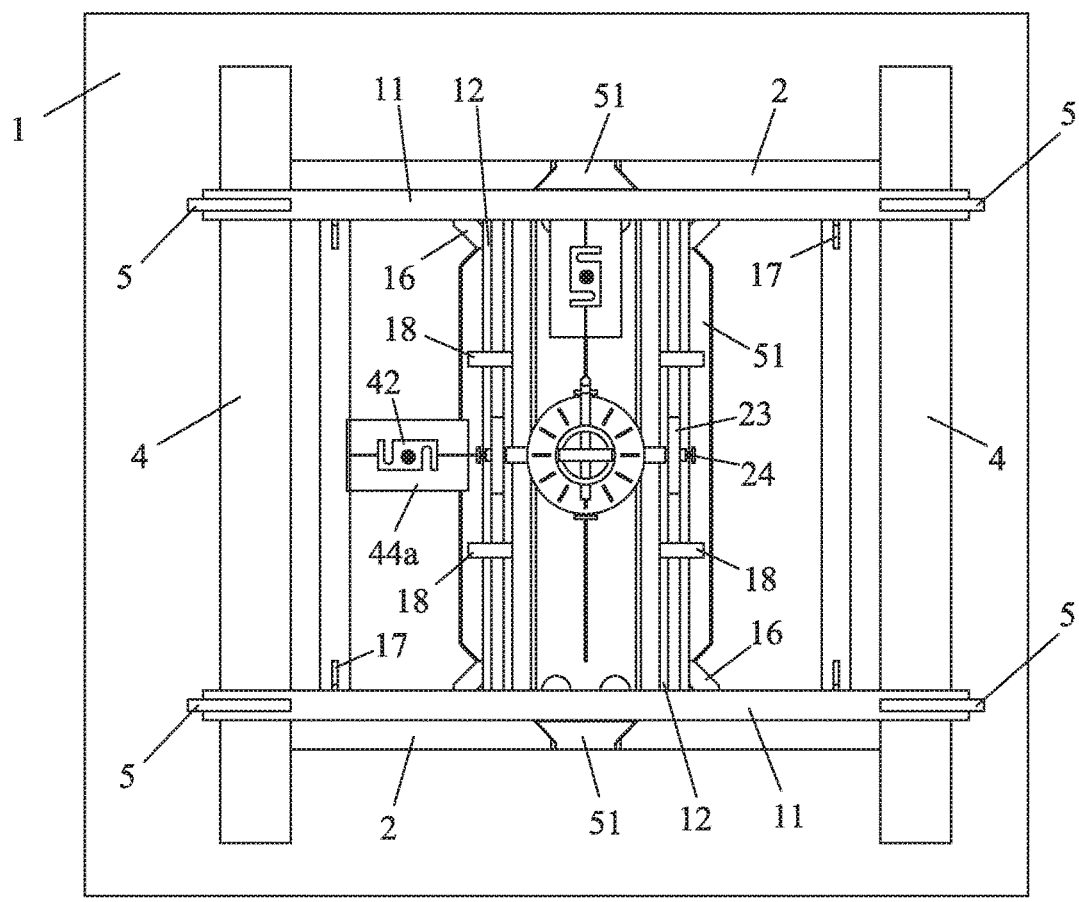
FIG. 2 is a top view of a testing device for a model of a floating gate in accordance with one embodiment of the disclosure.
Figure 3:
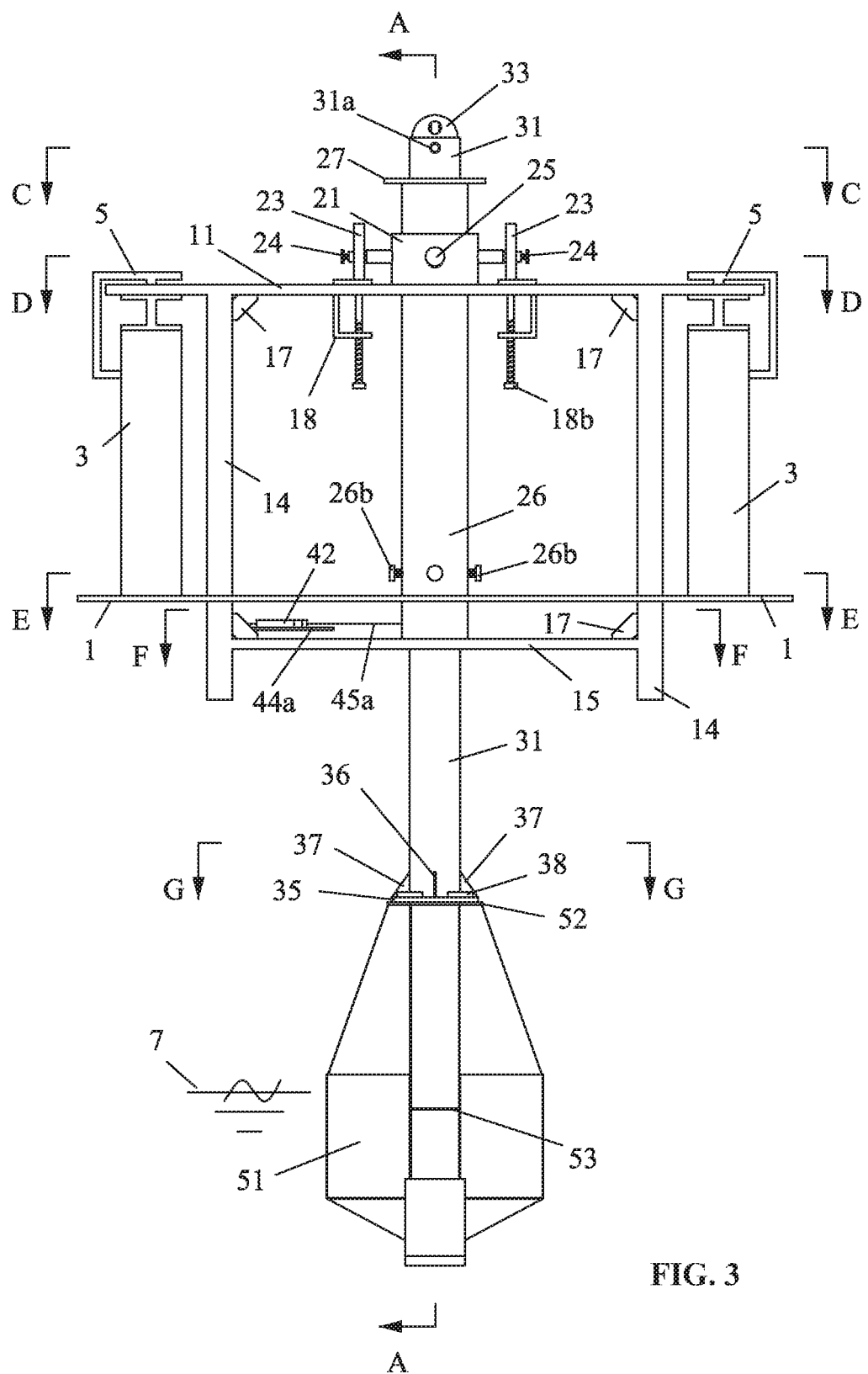
FIG. 3 is a front view of a testing device for a model of a floating gate in accordance with one embodiment of the disclosure.
Figure 4:
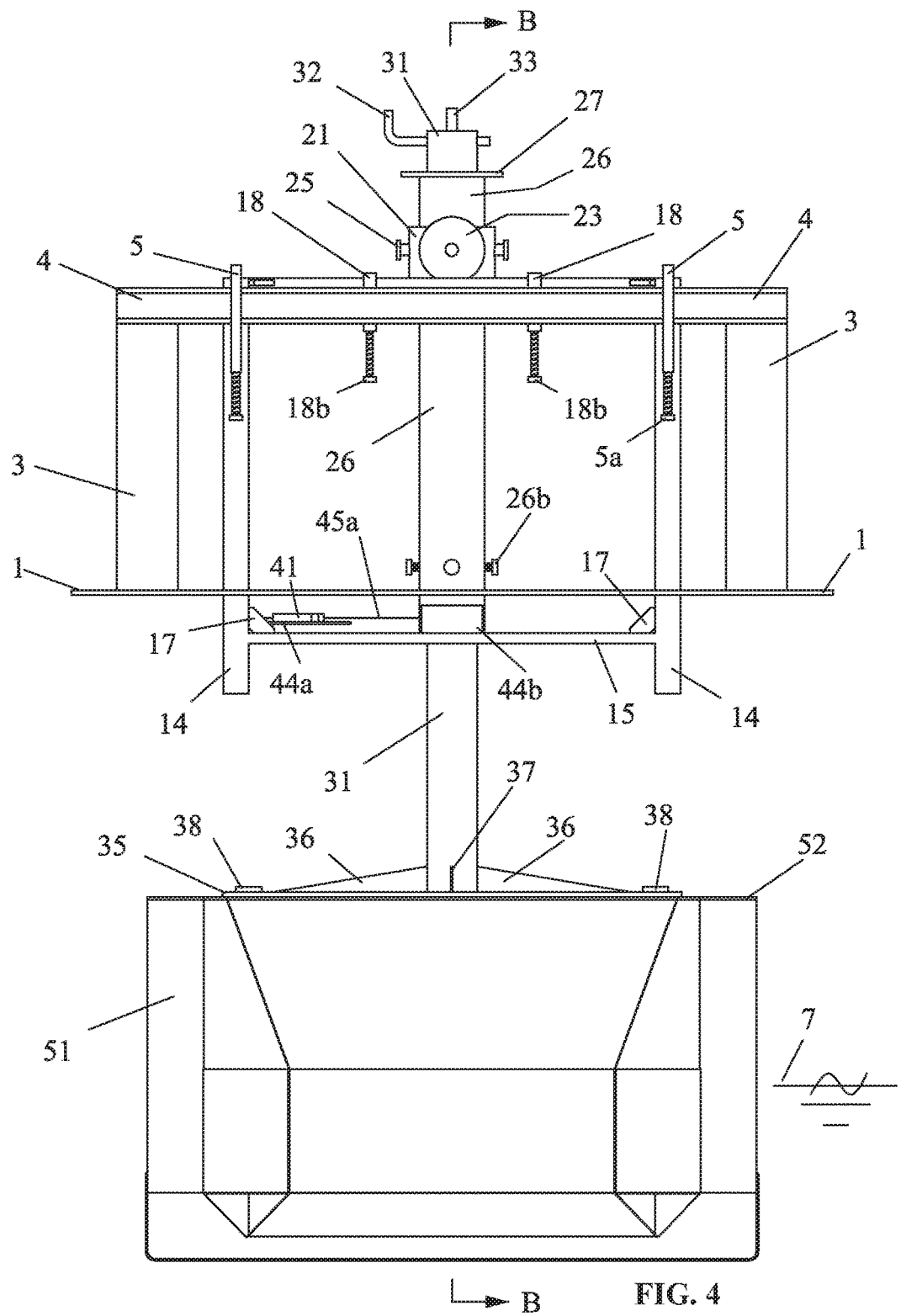
FIG. 4 is a side view of a testing device for a model of a floating gate in accordance with one embodiment of the disclosure.
Figure 5:
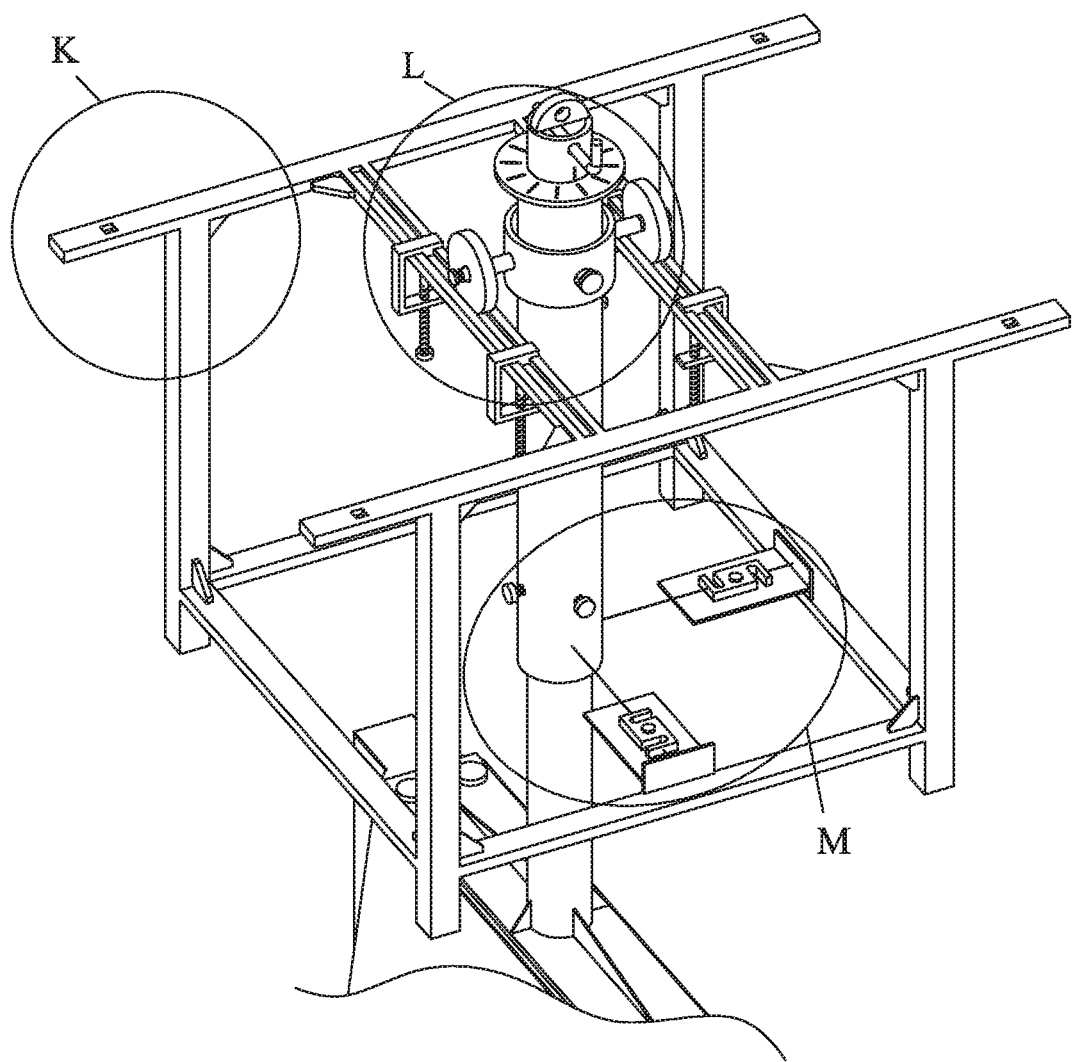
FIG. 5 is a partial perspective view of a testing device for a model of a floating gate in accordance with one embodiment of the disclosure.
Figure 6:
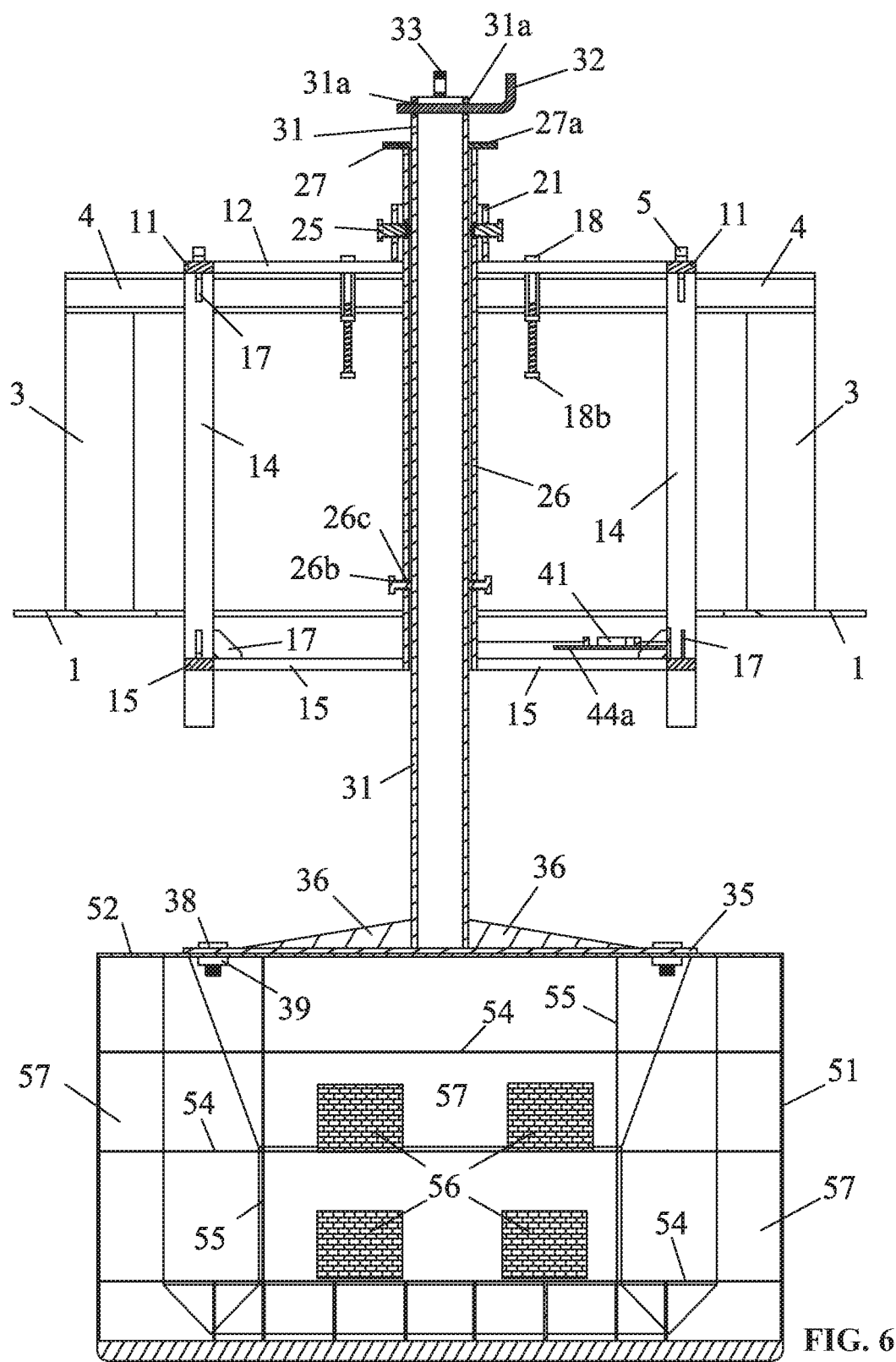
FIG. 6 is a cross-sectional view taken from line A-A in FIG. 3.
Figure 7:
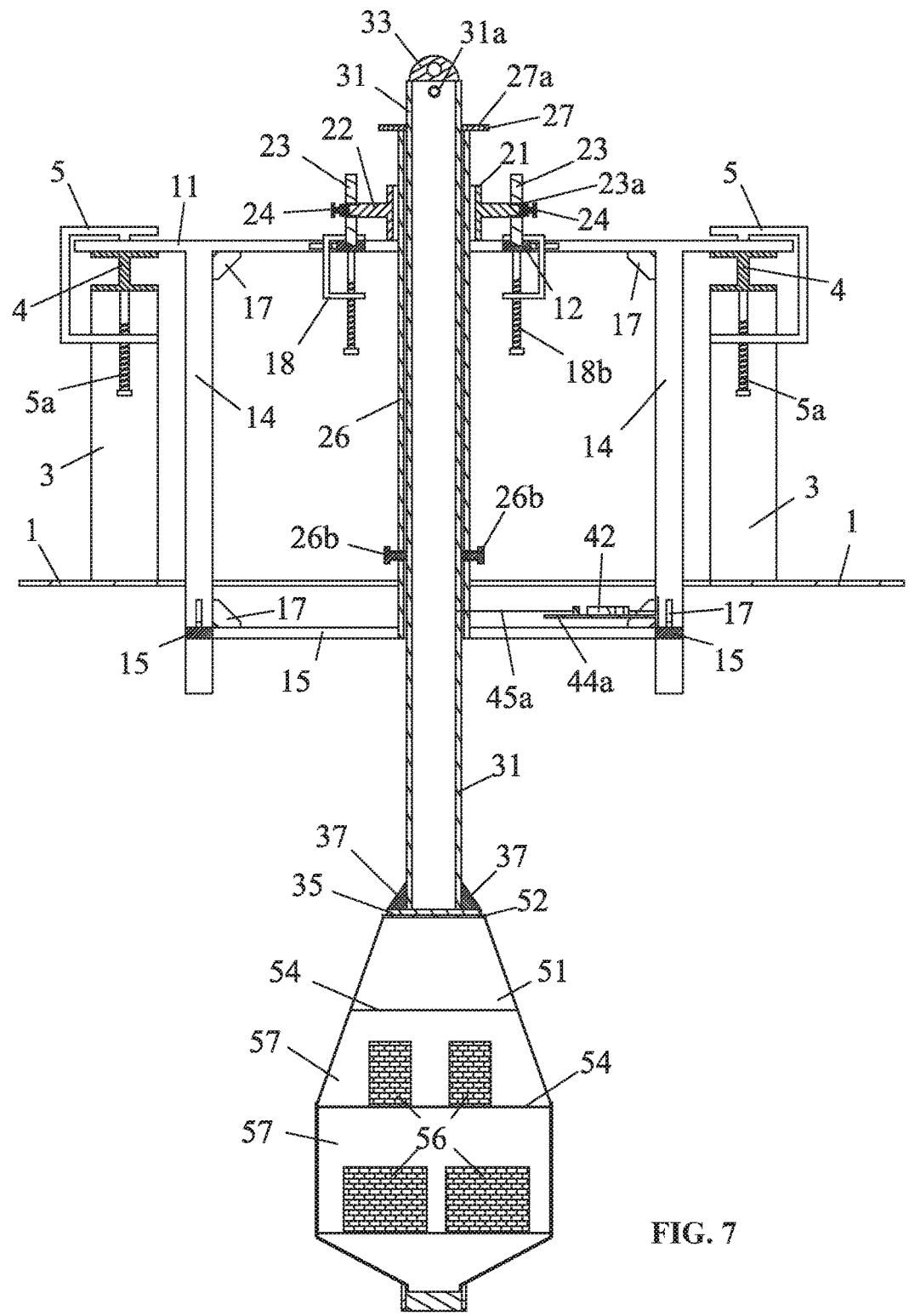
FIG. 7 is a cross-sectional view taken from line B-B in FIG. 4.
Figure 8:
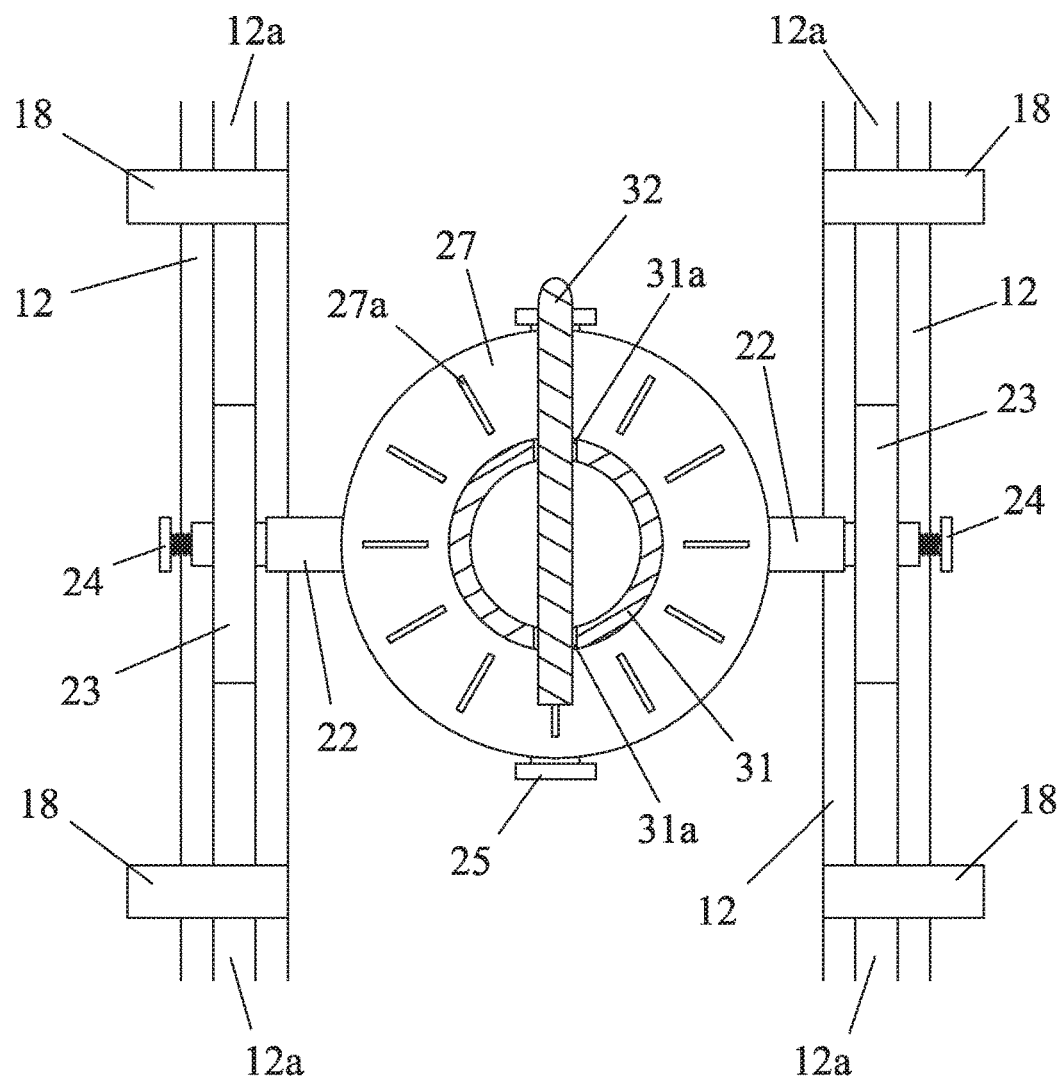
FIG. 8 is a cross-sectional view taken from line C-C in FIG. 3.
Figure 9:
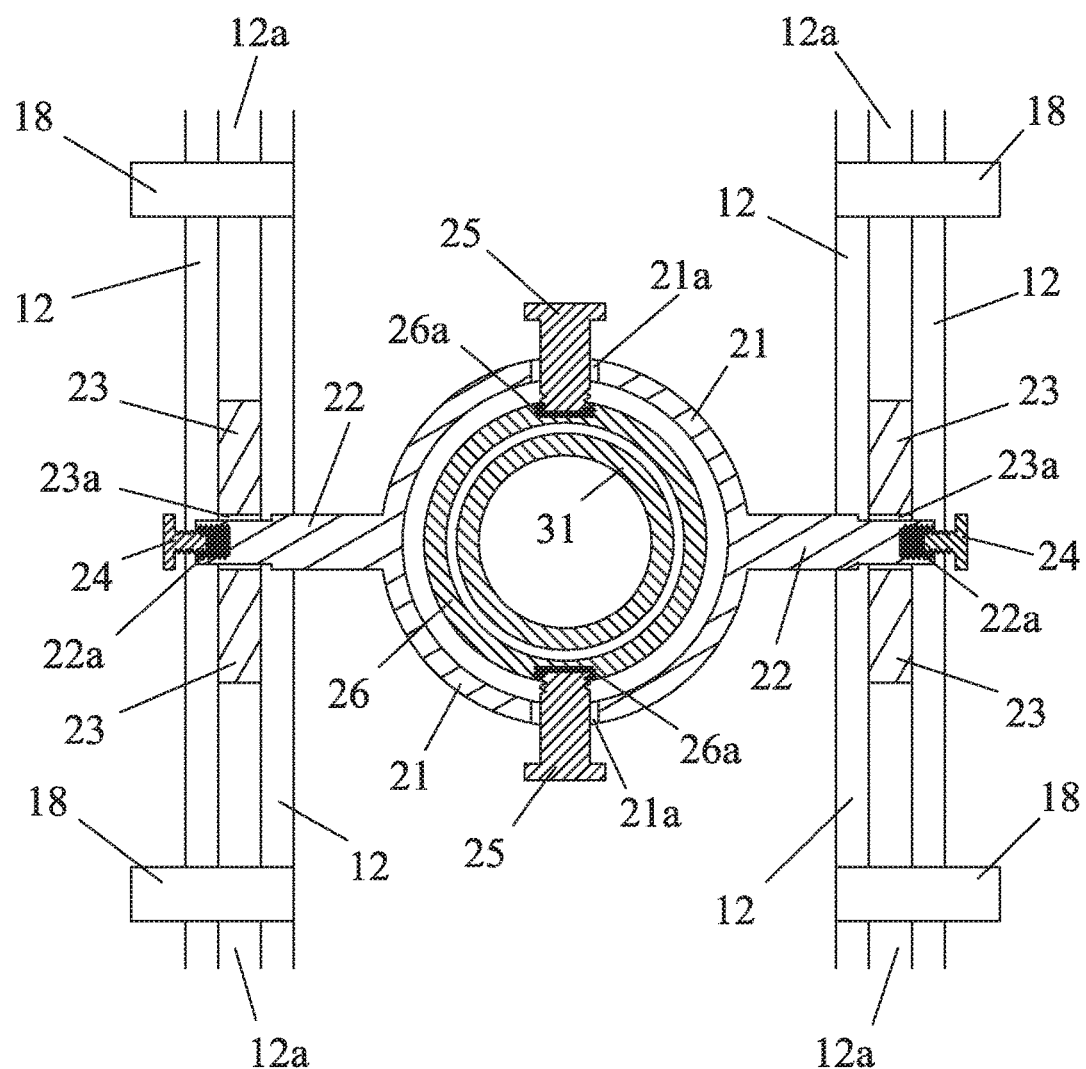
FIG. 9 is a cross-sectional view taken from line D-D in FIG. 3.
Figure 10:
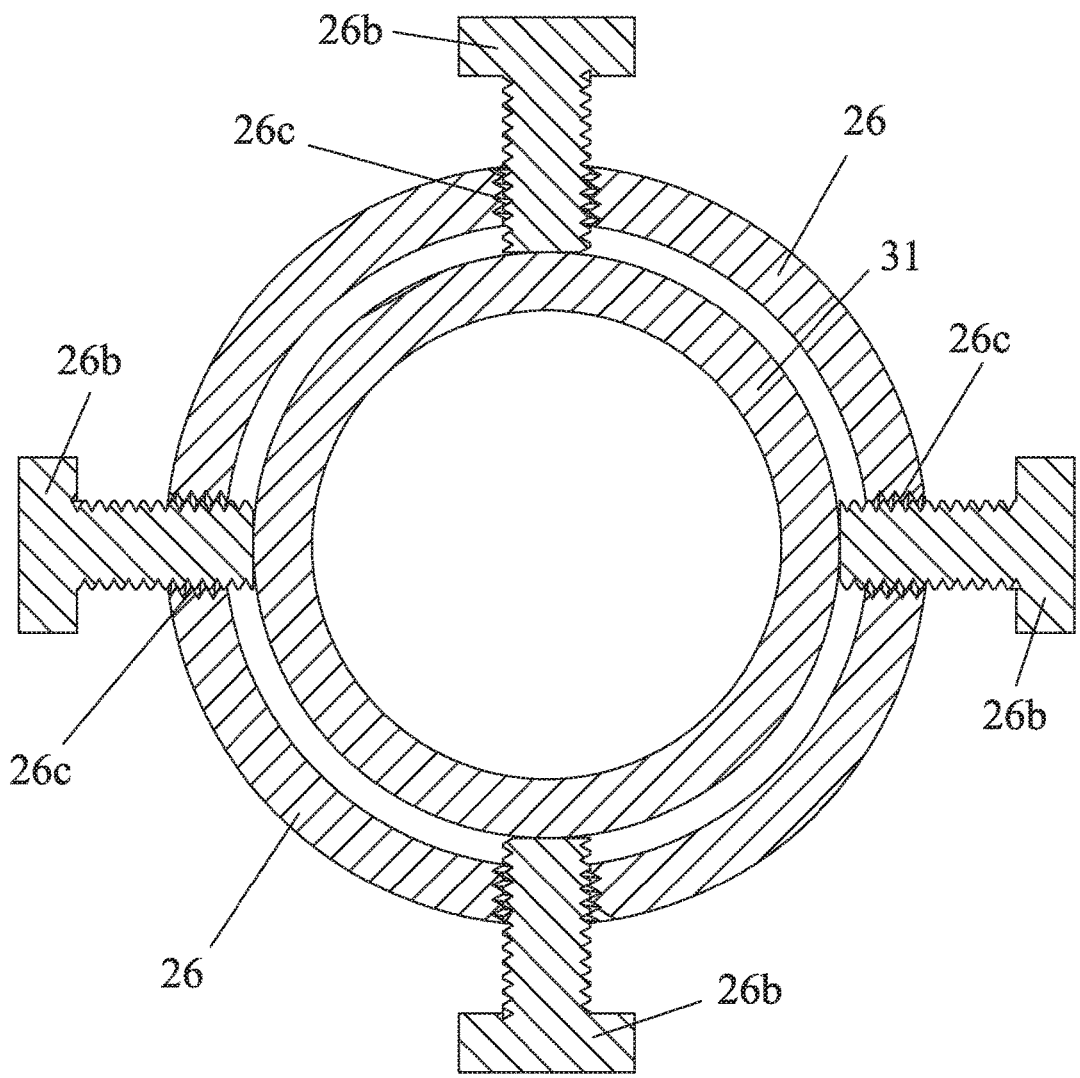
FIG. 10 is a cross-sectional view taken from line E-E in FIG. 3.
Figure 11:
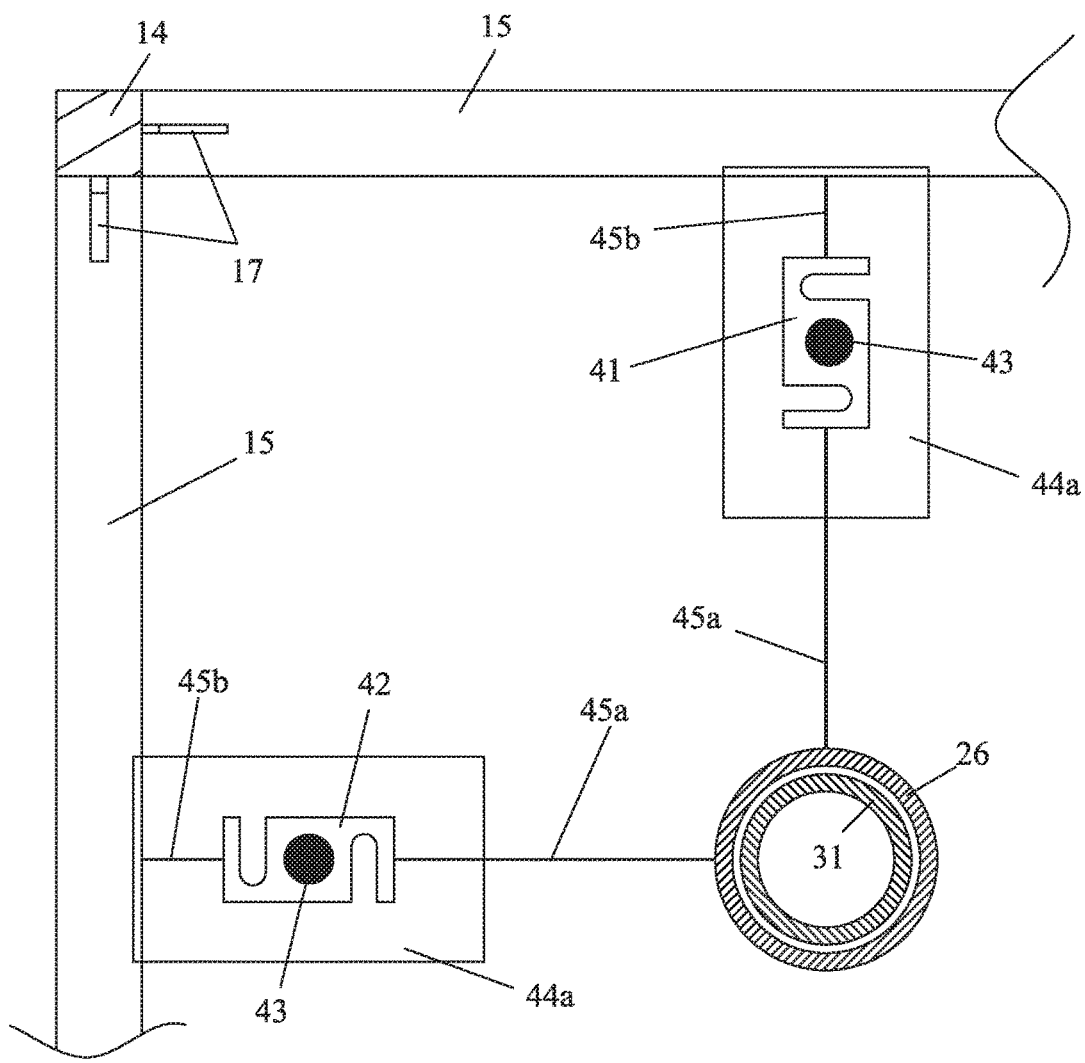
FIG. 11 is a cross-sectional view taken from line F-F in FIG. 3.
Figure 12:
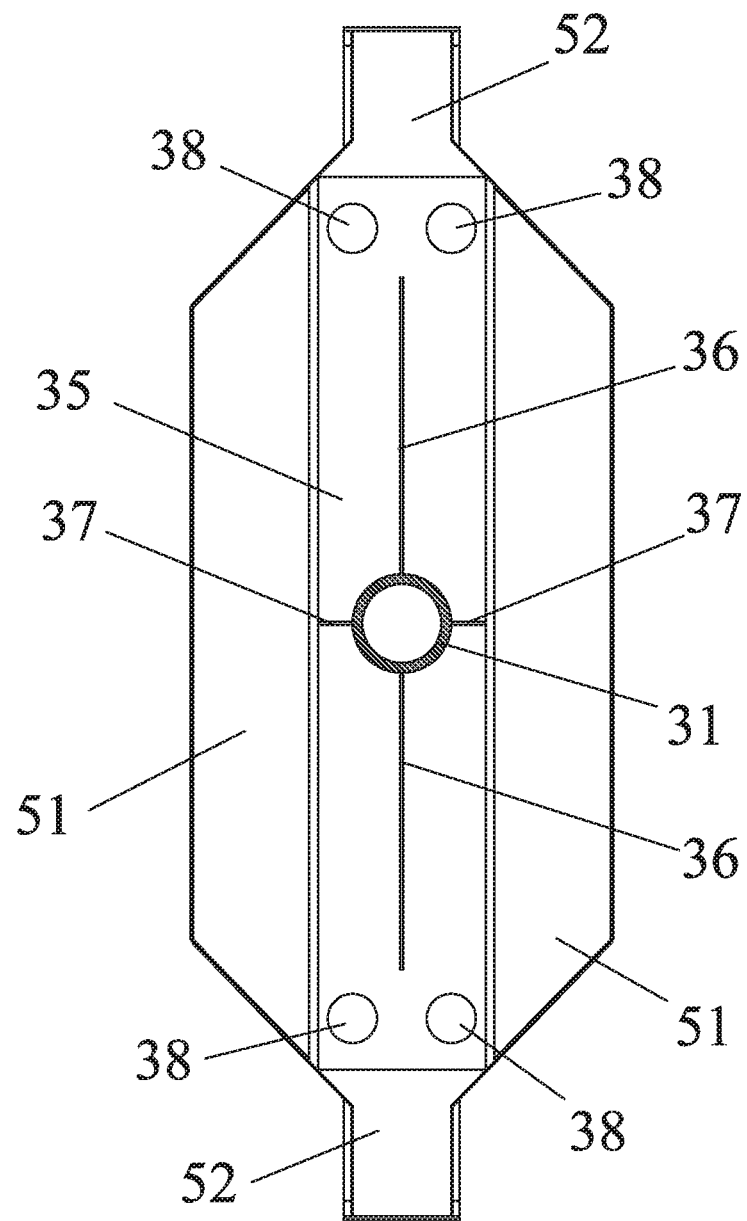
FIG. 12 is a cross-sectional view taken from line G-G in FIG. 3.
Figure 13:
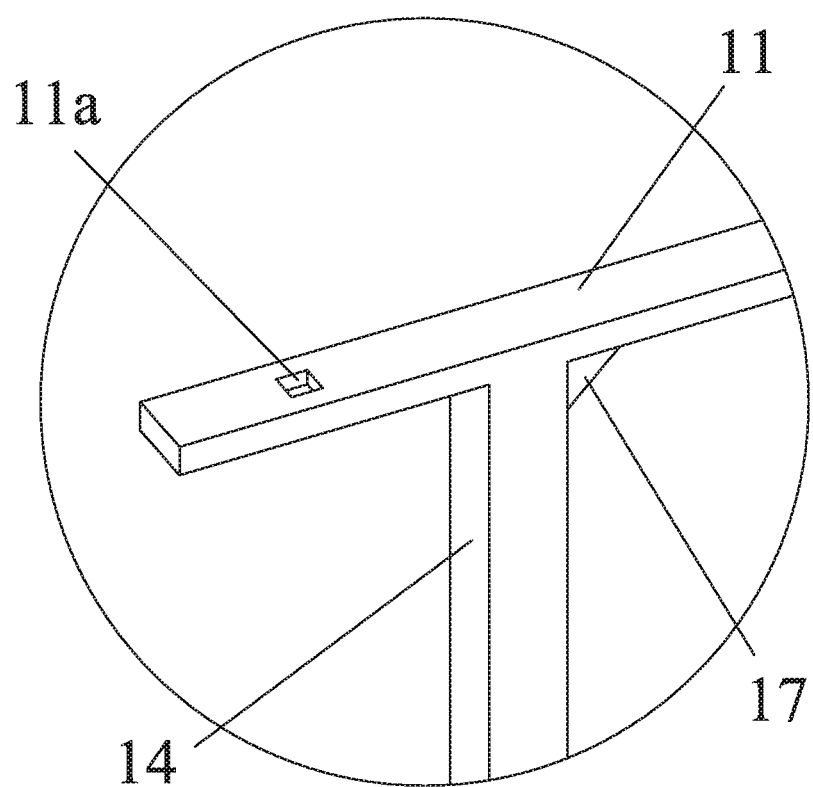
FIG. 13 is an enlarged view of part K in FIG. 5.
Figure 14:
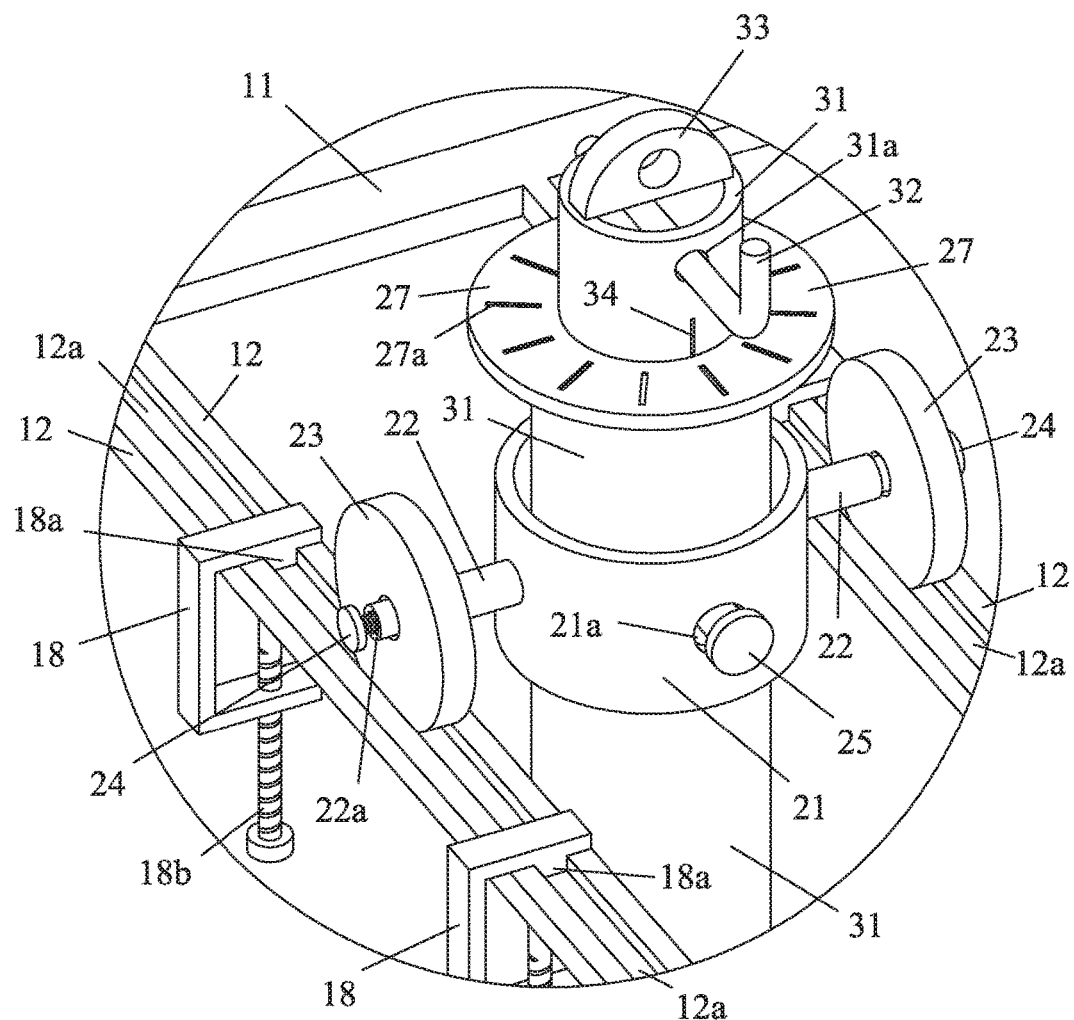
FIG. 14 is an enlarged view of part L in FIG. 5.
Figure 15:
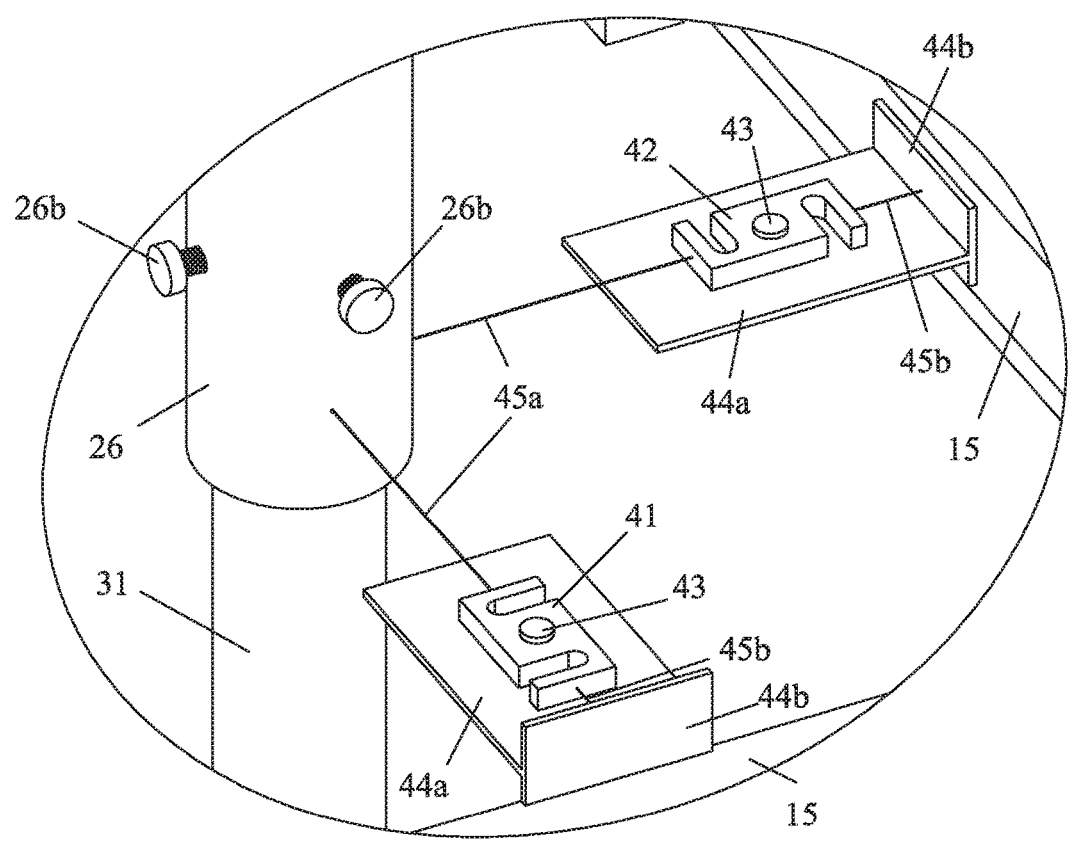
FIG. 15 is an enlarged view of part M in FIG. 5.
Figure 16:
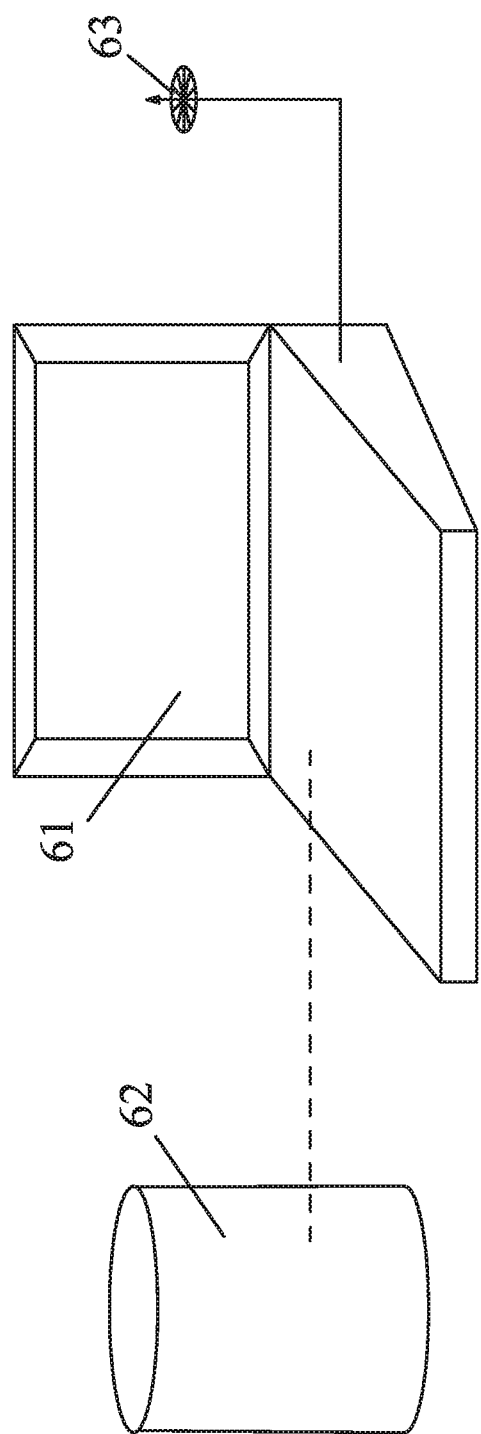
FIG. 16 is a schematic diagram showing a data acquisition mechanism of the disclosure.
Figure 17:
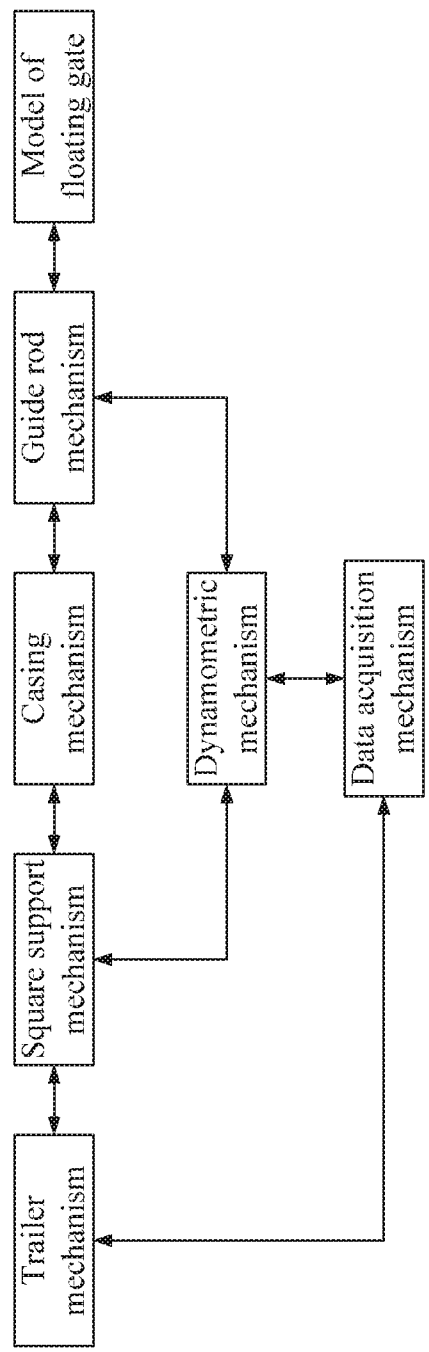
FIG. 17 is a block diagram showing connections between mechanisms of a testing device for a model of a floating gate of the disclosure.

FIG. 1 shows a perspective view of a testing device for a model of a floating gate. FIGS. 2, 3, and 4 show respectively a top view, a front view, and a side view of the testing device for a model of a floating gate in FIG. 1. FIG. 5 shows a partial perspective view of the testing device for a model of a floating gate in FIG. 1. FIG. 7 shows a cross-sectional view taken from line B-B in FIG. 4. FIGS. 6, 8, 9, 10, 11, and 12 show respectively cross-sectional views taken along A-A, C-C, D-D, E-E, F-F, and G-G in FIG. 3. FIGS. 13, 14, and 15 show respectively enlarged views of parts K, L, and M in FIG. 5. FIG. 16 shows components of a data acquisition mechanism. FIG. 17 shows connections between various mechanisms of the testing device for a model of a floating gate.

The testing device for a model of a floating gate comprises a towing carriage, a square support mechanism, a casing mechanism, a guide rod mechanism, a dynamometric mechanism, and a data acquisition mechanism. The connection between theses mechanisms is shown in FIG. 17.

As shown in FIG. 1, a coordinate system 8 is a reference coordinate system of a testing device for a model of a floating gate, in which X represents a longitudinal direction, Y represents a transversal direction, and Z represents a vertical direction.

As shown in FIG. 1, a towing carriage carries other mechanisms. A platform 1 of the towing carriage is disposed on a rail 9a at the upper surface of a longitudinal wall 9 of a towing tank. Under control of a computer 61 in the data acquisition mechanism (as shown in FIG. 16), the towing carriage reciprocates at various speeds along a moving direction 6 of the trailer (the direction of X). As shown in FIGS. 1, 2, 3, and 4, the square support mechanism is disposed in a moon pool 2 of the towing carriage. Two upper transversal beams 11 are disposed above two I-shaped longitudinal beams 4. The upper transversal beams 11 and the I-shaped longitudinal beams 4 form a rectangular structure. The upper transversal beams 11 are fastened to the I-shaped longitudinal beams 4 via four fastening clips 5. A boss at an inner side of each of the fastening clips 5 is inserted in a slot 11a at both ends of the upper transversal beams 11 (as shown in FIG. 13) and is secured by a fastening bolt 5a, so that the square support mechanism is connected to the towing carriage. As shown in FIGS. 1, 5, 8, and 14, the casing mechanism is disposed between two upper longitudinal beams 12 of the square support mechanism. Two rolling wheels 23 each roll within a guide slot 12a in the two upper longitudinal beams 12. Four retaining clips 18 restrict a range of movement of the rolling wheels 23 and adjust or restrain a position of the casing mechanism in the X direction in the square support mechanism. As shown in FIGS. 1, 3, 5, 6, 9, 10, and 12, the guide rod mechanism is disposed in the casing mechanism, with an inner sleeve 31 being inserted in an outer sleeve 26. The inner sleeve 31 and the outer sleeve 26 are arranged coaxially and have circumferential cross-sections that are concentric circles. The inner sleeve 31 is fastened to the outer sleeve 26 via four fastening bolts 26b. A connecting plate 35 at the lower end of the inner sleeve 31 is connected to a deck 52 of the floating gate via connecting bolts 38 and connecting nuts 39. As shown in FIGS. 1, 5, 11, and 15, the dynamometric mechanism is disposed in a plane surrounded by four lower beams 15 of the square support mechanism and is connected to the outer sleeve 26 of the casing mechanism and a straight plate 44b at the lower beams 15 of the square support mechanism via a first steel rope 45a and a second steel rope 45b at two ends of a longitudinal tensiometer 41 and a transversal tensiometer 42 respectively. As shown in FIG. 5, a configuration is formed in which the square support mechanism is connected to the guide rod mechanism via the casing mechanism at an upper end and the square support mechanism is connected to the guide rod mechanism via the dynamometric mechanism at a lower end. As shown in FIGS. 1, 5, and 12, a deck 52 of the floating gate is overlapped with and fastened to a connecting plate 35 of the guide rod mechanism via a connecting bolt 38. As shown in FIGS. 1, 5, 11, and 16, the data acquisition mechanism is typically disposed on the platform 1 of the towing carriage, and comprises a signal receiving terminal 63 that is in data communication with a signal transmitting terminals 43 of the dynamometric mechanism.

As shown in FIGS. 1, 3, and 4, the towing carriage comprises a platform 1, four circular columns 3, two I-shaped longitudinal beams 4, and four fastening clips 5. The platform 1 is arranged horizontally, with its upper surface connected perpendicularly to four circular columns 3 of the same length that are arranged in a rectangular shape. The two I-shaped longitudinal beams 4 are fastened to an upper end of the circular columns 3. The two I-shaped longitudinal beams 4 are arranged in parallel in the X direction. A rectangular moon pool 2 is provided on the platform 1, in a rectangular shape surrounded by the four circular columns.

As shown in FIGS. 1, 12, and 13, the square support mechanism comprises two upper transversal beams 11, two upper longitudinal beams 12, two guide slots 12a, four square columns 14, four lower beams 15, four retaining clips 18, four horizontal brackets 16, and twelve vertical brackets 17. The four lower beams 15 are arranged horizontally and fastened to each other in a rectangular shape. Four square columns 14 of the same length are connected perpendicularly to four corners of the rectangle. A vertical bracket 17 is connected at a right-angled connection between the lower beam 15 and the square column 14. A transversal beam 11 that is arranged horizontally in the Y direction is connected to an upper end of the square column 14. The two upper longitudinal beams 12 arranged in the X direction are connected perpendicularly between the two upper transversal beams 11. A horizontal bracket 16 is connected to a right-angled connection between the upper transversal beam 11 and the upper longitudinal beam 12. A guide slot 12a is provided along the length of the upper longitudinal beam 12. Two retaining clips 18 are disposed on each of the upper longitudinal beams 12. A retaining boss 18a on the retaining clip 18 is inserted in the guide slot 12a and is clamped by a retaining bolt 18b. The horizontal brackets 16 and the vertical brackets 17 can improve the strength and stability of the square support.

As shown in FIGS. 1, 2, 5, 6, 7, and 14, the casing mechanism comprises a universal-joint sleeve 21, two stepped shafts 22, two rolling wheels 23, two longitudinal shaft bolts 25, an outer sleeve 26, a dial scale 27, and four fastening bolts 26b. The universal-joint sleeve 21 and the outer sleeve 26 are both hollow circular columns. The universal-joint sleeve 21 is sleeved over the outer sleeve 26 and is arranged coaxially with the outer sleeve 26. Large-diameter ends of the stepped shafts 22 are radially connected symmetrically to an outer side of the universal-joint sleeve 21. Small-diameter ends of the two stepped shafts 22 pass through axle holes 23a at the center of the rolling wheels 23, such that the rolling wheels 23 can rotate freely about the stepped shafts 22. The small-diameter ends of the stepped shafts 22 each have a shaft-end bolt hole 22a, and a shaft-end bolt 24 is screwed in the shaft-end bolt hole 22a. A diameter of the large-diameter ends of the stepped shafts 22 and a diameter of a bolt nut of the shaft-end bolts 24 is slightly larger than a diameter of the axle holes 23a of the rolling wheels 23. The two rolling wheels 23 roll in the guide slots 12a of the upper longitudinal beams 12 respectively. The retaining clips 18 restrict a range of movement of the rolling wheels 23 in the X direction. At this point, the stepped shafts 22 are parallel to the upper transversal beams 11 and perpendicular to the upper longitudinal beams 12. The universal-joint sleeve 21 swings about the axis of the stepped shafts 22. Two longitudinal shaft holes 21a are radially formed symmetrically in the universal-joint sleeve 21 perpendicular to the direction of the stepped shafts 22. Two shaft bolt holes 26a are radially formed symmetrically in the outer sleeve 26. Two longitudinal shaft bolts 25 pass through the longitudinal shaft holes 21a in a radially symmetrical manner to be screwed in the shaft bolt holes 26a on the outer sleeve 26. At this point, the universal-joint sleeve 21 swings about the longitudinal shaft bolts 25. A dial scale 27 is connected to an upper end of the outer sleeve 26. Scale lines 27a spaced apart by equal angles are imprinted on an upper surface of the dial scale 27. An inner diameter of the dial scale 27 is slightly larger than an outer diameter of the inner sleeve 31 of the guide mechanism. Four fastening bolt holes 26c are radially formed symmetrically at a lower end of the outer sleeve 26. The fastening bolts 26b are screwed through the fastening bolt holes 26c to be in contact with an external wall of the inner sleeve 31. Optionally, the fastening bolts 26b may be arranged axially in the outer sleeve 26 in a repeated pattern to enable a clamped connection between the outer sleeve 26 and the inner sleeve 31.

As shown in FIGS. 1, 5, 6, 7, 9, 10, 12, and 14, the guide rod mechanism comprises the inner sleeve 31, an angle wrench 32, a hoist ring 33, a baseline, a connecting plate 35, a long bracket 36, a short bracket 37, and four connecting bolts 38. The inner sleeve 31 is fitted radially in the outer sleeve 26 and the dial scale 27. The inner sleeve 31 and the outer sleeve 26 are arranged in the same radial direction and are axially movable and rotatable about an axis. The position of the inner sleeve 31 relative to the outer sleeve 26 is fixed by the fastening bolts 26b. A baseline is imprinted on an outer side of the inner sleeve 31. A wrench hole 31a is formed radially at an upper end of the inner sleeve 31. The angle wrench 32 passes through the wrench hole 31a. In a loosened state of the fastening bolts 26b, the inner sleeve 31 is turned by the angle wrench 32, such that the baseline on the inner sleeve 31 corresponds to a scale line 27a on the dial scale 27 for adjustment of a relative rotation angle between the inner sleeve 31 and the outer sleeve 26. A hoist ring 33 is connected radially to an upper port of the inner sleeve 31 to facilitate adjustment of the angle between the inner sleeve 31 and the outer sleeve 26 when a hoist is hooked to the hoist ring 33. A connecting plate 35 is connected to a lower port of the inner sleeve 31. At a right-angled connection between the inner sleeve 31 and the connecting plate 35, a pair of long brackets 36 are connected symmetrically along a long side of the connecting plate 35, and a pair of short brackets 35 are connected symmetrically along a short side of the connecting plate 35. At the two end portions of the connecting plate 35 along the long side, the connecting plate 35 is connected with the floating gate below via two connecting bolts and two nuts. In a loosened state of the fastening bolts 26b, when the draft waterline 53 of the model of a floating gate 51 matches the water surface 7, an axial position of the inner sleeve 31 relative to the outer sleeve 26 is established.

As shown in FIGS. 1, 5, 11, and 15, the dynamometric mechanism comprises a longitudinal tensiometer 41, a transversal tensiometer 42, two signal transmitting terminals 43, two support plates 44a, two straight plates 44b, two first steel ropes 45a, and two second steel ropes 45b. The longitudinal tensiometer 41 is installed in the X direction, and the transversal tensiometer 42 is installed in the Y direction. The support plates 44a and the straight plates 44b are connected at a right angle. The straight plates 44b are perpendicularly connected to the lower beams 15. The longitudinal tensiometer 41 and the transversal tensiometer 42 are disposed on the horizontal support plates 44a, and are connected to the outer sleeve 26 via the first steel rope 45a and connected to the straight plates 44b via the second steel ropes 45b. The longitudinal tensiometer 41 and the transversal tensiometer 42 both have a signal transmitting terminal 43 for transmitting numerical signals to the signal receiving terminal 63 of the data acquisition mechanism.

As shown in FIGS. 1, 6, 7, and 12, the model comprises a floating gate 51, a deck 52, a waterline 53, a horizontal watertight separator 54, a vertical watertight separator 55, a counter weight 56, and a watertight compartment 57. The floating gate 51 has a watertight outer surface, and is internally divided into several watertight compartments 57 by the horizontal watertight separator 54 and the vertical watertight separator 55. A counter weight 56 is disposed in each of the watertight compartments 57. A waterline 53 is marked on a side face of the floating gate 51. In a loosened state of the fastening bolts 26b, a position of the water surface 7 relative to the waterline 53 is determined by the weight and distribution of the counter weights 56. The deck 52, which is located on the upper surface of the floating gate 51, lies against the connecting plate 35. The floating gate 51 is secured below the inner sleeve 31 via the connecting bolts 38 and nuts 39.

As shown in FIGS. 15 and 16, the data acquisition mechanism comprises a computer 61, a database 62, and a signal receiving terminal 63. The data acquisition mechanism may be disposed on the platform 1, or alternatively may be disposed on a fixed position on the ground. Once the signal receiving terminal 63 receives data information from the signal transmitting terminals 43 of the dynamometric mechanism, software in the computer 61 analyses the data, and saves and backs up the data in the database 62.

As shown in FIGS. 1 and 5, the testing device for a model of a floating gate has five degrees of freedom, which is necessary for hydrodynamic tests of models under various operating conditions. A first degree of freedom is enabled by movement in the X direction including movement of the towing carriage in the moving direction 6 of the trailer and movement in the X direction generated by the rolling wheels 23 of the casing mechanism along the guide slots 12a of the square support mechanism. The computer 61 of the data acquisition mechanism controls the speed and acceleration of the towing carriage in the moving direction 6 of the trailer based on flow characteristics under the testing condition. The retaining clips 18 of the square support mechanism control the range of movement of the casing mechanism to adjust a longitudinal position of the model of a floating gate in the moon pool 2. A second degree of freedom is enabled by movement in the Z direction. The orientation of the floating gate 51 in water is determined by the weight and distribution of the counter weights 56 disposed in the watertight compartments 57. For the orientation under each testing condition, there is a corresponding waterline 53. A top end of the floating gate 51 is connected to a lower end of the inner sleeve 31 in the guide rod mechanism. The inner sleeve 31 moves in the Z direction within the outer sleeve 26 of the casing mechanism to achieve alignment between the water surface 7 in the testing tank and the draft waterline 53 of the floating gate 51, at which point the position of the inner sleeve 31 is fixed by the fastening bolts 26b. A third degree of freedom is enabled by rotation about the Z axis. Since the floating gate 51 is connected to the inner sleeve 31 via the connecting plate 35, the angle between the floating gate 51 and the moving direction 6 (direction of the water flow) of the trailer may be adjusted by turning the inner sleeve 31 with the angle wrench 32 with reference to the angle between the scale line 27a on the dial scale 27 of the casing mechanism and the baseline on the inner sleeve 31 of the guide mechanism. Then the outer sleeve 26 is fastened to the inner sleeve 31 via the fastening bolts 26b to maintain the adjusted angle between the floating gate 51 and the direction of the water flow. A fourth degree of freedom is enabled by rotation about the X axis, and the fifth degree of freedom is enabled by rotation about the Y axis. Both degrees of freedom of rotation about an axis are realized by the casing mechanism. Specifically, the stepped shafts 22 and the longitudinal shaft bolts 25 of the casing mechanism allow the inner sleeve 31 of the guide mechanism to swing about the Y axis and the X axis. Such a displacement of swinging enables measurement by the longitudinal tensiometer 41 and the transversal tensiometer 42 of the dynamometric mechanism. As such, the first, second, and third degrees of freedom serve to regulate the position and orientation of the floating gate 51 in the water and the water flow velocity thus providing various testing conditions for the floating gate 51. The fourth and fifth degrees of freedom serve the dynamometric process of the tensiometers of the dynamometric mechanism.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A testing device for a model of a floating gate, the device comprising:
   a towing carriage comprising a platform and a moon pool;
   a square support mechanism comprising two upper transversal beams, two upper longitudinal beams, two I-shaped longitudinal beams, four lower beams, and straight plates disposed on two of the four lower beams; the two I-shaped longitudinal beams comprising guide slots and four retaining clips disposed at two sides of the guide slots;
   a dynamometric mechanism comprising a longitudinal tensiometer, a transversal tensiometer, and a signal transmitting terminal; two ends of the longitudinal tensiometer and the transversal tensiometer being connected to first steel ropes and second steel ropes, respectively;
   a data acquisition mechanism comprising a computer and a signal receiving terminal;
   a casing mechanism comprising two stepped shafts and two rolling wheels, the two rolling wheels being connected to the two stepped shafts, respectively; and
   a guide rod mechanism comprising an inner sleeve, an outer sleeve, and a connecting plate; one end of the connecting plate being connected to a lower end of the inner sleeve, and the other end being connected to a deck of the floating gate;
   wherein:
   the platform of the towing carriage is supported by a rail disposed on a longitudinal wall of a towing tank;
   the computer of the data acquisition mechanism is adapted to control the towing carriage to reciprocate;
   the square support mechanism is disposed in the moon pool of the towing carriage;
   the two upper transversal beams are disposed on the two I-shaped longitudinal beams; the two upper transversal beams and the two I-shaped longitudinal beams form a rectangular structure, and the two upper transversal beams are fastened to the two I-shaped longitudinal beams via four fastening clips; each of the four fastening clips comprises a boss, and both ends of the two upper transversal beams are provided with a slot corresponding to the boss; the boss is fixed in the slot using a fastening bolt, so that the square support mechanism is connected to the towing carriage;
   the casing mechanism is disposed between the two upper longitudinal beams of the square support mechanism, the two rolling wheels slide in the guide slots of the two upper longitudinal beams, and the four retaining clips disposed at two sides of the guide slots limit a moving range of the two rolling wheels;
   the guide rod mechanism is disposed in the casing mechanism; the inner sleeve of the guide rod mechanism is inserted in and concentric with the outer sleeve; the inner sleeve is fastened to the outer sleeve via four fastening bolts;

the dynamometric mechanism is disposed in a plane defined by the four lower beams of the square support mechanism, and is connected to the outer sleeve of the guide rod mechanism and the straight plates on the lower beams of the square support mechanism via the first steel ropes and the second steel ropes connected to the longitudinal tensiometer and the transversal tensiometer; and the data acquisition mechanism is disposed on the platform of the towing carriage, and the signal receiving terminal of the data acquisition mechanism is in data communication with the signal transmitting terminal of the dynamometric mechanism.

2. The device of claim 1, wherein:

the guide rod mechanism further comprises a dial scale; the outer sleeve and the dial scale sleeve the inner sleeve;

the inner sleeve and the outer sleeve are arranged in the same radial direction and are axially movable and rotatable about an axis;

the inner sleeve comprises an outer wall, a baseline disposed on the outer wall, a top end, a hoist ring disposed on the top end, and a wrench hole radially formed on an upper part of the inner sleeve; an angle wrench is disposed in the wrench hole and adapted to drive the inner sleeve such that the baseline on the inner sleeve corresponds to a scale line on the dial scale to adjust a relative rotation angle between the inner sleeve and the outer sleeve; and the hoist ring is connected to a hoist; the lower end of the inner sleeve is connected to the connecting plate.

3. The device of claim 1, wherein:

the casing mechanism further comprises a universal-joint sleeve sleeving the outer sleeve of the guide rod mechanism;

the two stepped shafts comprise first ends and second ends, and a diameter of the first ends is larger than that of the second ends;

the two stepped shafts are radially symmetrically connected to the universal-joint sleeve via the first ends; the two rolling wheels comprise axle holes, and the second ends of the two stepped shafts pass through the axle holes, respectively;

the rolling wheels are capable of rotating freely about the two stepped shafts;

the second ends of the two stepped shafts comprise shaft-end bolt holes, and shaft-end bolts are disposed in the shaft-end bolt holes; a diameter of the first ends of the two stepped shafts and a diameter of nuts of the shaft-end bolts are larger than a diameter of the axle hole of the two rolling wheels;

the two rolling wheels roll in the guide slots of the two upper longitudinal beams, respectively;

the two stepped shafts are parallel to the two upper transversal beams and perpendicular to the two upper longitudinal beams; the universal-joint sleeve swings about the axis of the two stepped shafts;

the universal-joint sleeve further comprises two longitudinal shaft holes which are radially formed in the universal-joint sleeve and perpendicular to the two stepped shafts; the outer sleeve comprises two radially symmetrically bolt holes; and two longitudinal shaft bolts pass through the two longitudinal shaft holes of the universal-joint sleeve, and are fixed on the two radially symmetrically bolt holes of the outer sleeve.

4. A method for using the testing device for a model of a floating gate of claim 1, the method comprising:

1) determining a speed for towing the towing carriage based on a water flow rate and a scale ratio of the model of a floating gate;
2) determining an angle of current between the model of a floating gate and a moving direction of the towing carriage based on a water flow direction;
3) marking waterlines at both ends of the model of a floating gate based on a designed draft of the floating gate and a scale ratio of the model, and adjusting a height difference between the waterlines and a water surface of a towing tank by changing the weight and distribution of counter weights in watertight compartments of the model;
4) mounting and fastening the square support mechanism on the moon pool of the towing carriage via fastening clips; placing and fastening the guide mechanism in the casing mechanism via fastening bolts; hoisting and mounting the guide mechanism and the casing mechanism in the square support mechanism, and allowing the two rolling wheels of the casing mechanism to be in the guide slots;
5) allowing the model of a floating gate to float below the moon pool of the towing carriage, and connecting the model of a floating gate to the inner sleeve of the guide rod mechanism;
6) turning the inner sleeve using an angle wrench to align a scale line on a dial scale of the guide rod mechanism with a baseline of the inner sleeve based on the angle of current, and then tightening the inner sleeve and the model of a floating gate;
7) adjusting a position of the two rolling wheels in the guide slots of the two upper longitudinal beams, determining a longitudinal position of the model of a floating gate in the moon pool, and then fixing the two rolling wheels in the guide slots via the four retaining clips;
8) installing the longitudinal tensiometer and the transversal tensiometer, connecting the first steel ropes and the second steel ropes, and allowing the inner sleeve to swing freely in the casing mechanism; and
9) initializing and calibrating the longitudinal tensiometer and the transversal tensiometer; confirming communication connection between the signal transmitting terminal and the signal receiving terminal; controlling, by the computer, a towing speed, an acceleration, and a travel distance of the towing carriage; on-line recording and analyzing date through measurement and analysis software installed in the computer, and storing a backup file in a database.

* * * * *